(12) United States Patent
Chen et al.

(10) Patent No.: US 9,470,865 B1
(45) Date of Patent: Oct. 18, 2016

(54) PRE-TERMINATED FIBER CABLE

(71) Applicant: Verizon Patent and Licensing Inc., Arlington, VA (US)

(72) Inventors: David Z. Chen, Richardson, TX (US); Christina M. Colasanto, New Ipswich, NH (US); Christopher D. Levendos, Yonkers, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/674,475

(22) Filed: Mar. 31, 2015

(51) Int. Cl.
   *G02B 6/44* (2006.01)
   *G02B 6/00* (2006.01)
   *G02B 6/50* (2006.01)
   *G02B 6/38* (2006.01)

(52) U.S. Cl.
   CPC ............. *G02B 6/443* (2013.01); *G02B 6/3866* (2013.01); *G02B 6/4485* (2013.01); *G02B 6/50* (2013.01)

(58) Field of Classification Search
   CPC  G02B 6/4438; G02B 6/4464; G02B 6/4465; G02B 6/4485; G02B 6/4471; G02B 6/50; G02B 6/52; G02B 6/54
   See application file for complete search history.

(56) References Cited

U.S. PATENT DOCUMENTS

| | | | | |
|---|---|---|---|---|
| 6,278,831 B1 * | 8/2001 | Henderson | ........... | G02B 6/4473 385/100 |
| 7,272,283 B2 * | 9/2007 | Temple, Jr. | .......... | G02B 6/4404 385/109 |

* cited by examiner

*Primary Examiner* — Omar R Rojas (57) ABSTRACT

A cable assembly may include a plurality of cable connectors and a cable jacket. Each cable connector may include a ferrule and a cable boot. Each ferrule may have a ferrule passage between a leading end and a trailing end and may be configured to receive an optical fiber. Each cable boot may include a first end with a recess configured to receive at least a portion of the ferrule and a second end having a boot passage connected to the recess and configured to receive at least a portion of the optical fiber. The cable jacket may include a jacket passage between a first portion and a second portion and may be configured to selectively release the plurality of cable connectors in the first configuration and receive the plurality of cable connectors in the second configuration.

20 Claims, 7 Drawing Sheets

PRE-TERMINATED FIBER CABLE

BACKGROUND

Cable systems may include micro-ducts to route and bundle multiple sets of optical fibers in a cable jacket. These cable systems may be routed to an installation site through existing ducts in roadways and buildings. Within the cable systems, spaces are typically formed between the microducts, optical fibers, and cable jacket thereby allowing airflow for the insertion and routing of the cable system with the duct acting as a guide to the installation site, which may be applied with an air jet from a blower. At the installation site, typical optical cables are cut to a desired length and custom fusion spliced for proper termination, which may be time consuming and unnecessarily increase insertion loss, e.g., signal power resulting from the fusion splice. Further, the optical fibers may include a leading end that provides an optical connection to a fiber distribution hub, but the leading end is typically fragile and unprotected thereby making it susceptible to damage during installation. Thus, it may be desirable to provide a cable assembly that protects the optical fibers from contaminants and damage during installation and is pre-assembled to expedite the installation thereof.

DETAILED DESCRIPTION

A cable assembly may include a plurality of cable connectors and a cable jacket. The plurality of cable connectors may include at least a first configuration and a second configuration. Each cable connector may include a ferrule and a cable boot. Each ferrule may have a ferrule passage between a leading end and a trailing end and may be configured to receive an optical fiber. Each cable boot may include a first end with a recess configured to receive at least a portion of the ferrule and a second end having a boot passage connected to the recess and configured to receive at least a portion of the optical fiber. The cable jacket may include a jacket passage between a first portion and a second portion and may be configured to selectively release the plurality of cable connectors in the first configuration and receive the plurality of cable connectors in the second configuration. The plurality of cable connectors may be are external to the cable jacket in the first configuration and internal to the cable jacket in the second configuration.

Methods for a cable assembly are contemplated. A portion of a cable jacket may be removed to expose a plurality of optical fibers. Each of the plurality of optical fibers may be cut to one, different, or staggered predefined lengths. A cable boot may then be positioned relative to each of the plurality of optical fibers, a ferrule may be positioned along each of the plurality of optical fibers and into a recess of each respective cable boot thereby forming a plurality of cable connectors, and one or a plurality of rip cords, e.g., also referred to as stripping cords, may be positioned in the cable jacket. To urge the cable connectors into the cable jacket, one or more forces may be applied to the connectors to move the cable connectors between a first configuration, at least a portion being exterior to the cable jacket, and a second configuration, at least a portion being interior to the cable jacket. After the plurality of cable connectors are moved into the cable jacket, a cap may be positioned relative to the cable jacket thereby covering the plurality of cable connectors and resisting the introduction of contaminants into the assembly. As a result, a pre-terminated assembly is formed.

A comparable operation may be performed for installation of the cable assembly. The cap may be opened to expose the plurality of cable connectors and the one or more rip cords may be pulled to extend at least a portion of the plurality of cable connectors from the cable jacket. The cable connectors may then be cleaned using an air jet from a blower, e.g., to remove contaminants from the assembly. Thereafter, the cable connectors are positioned in a connector housing and installed into a fiber distribution hub having any number of electrical switches and receptacles.

Figure 1:
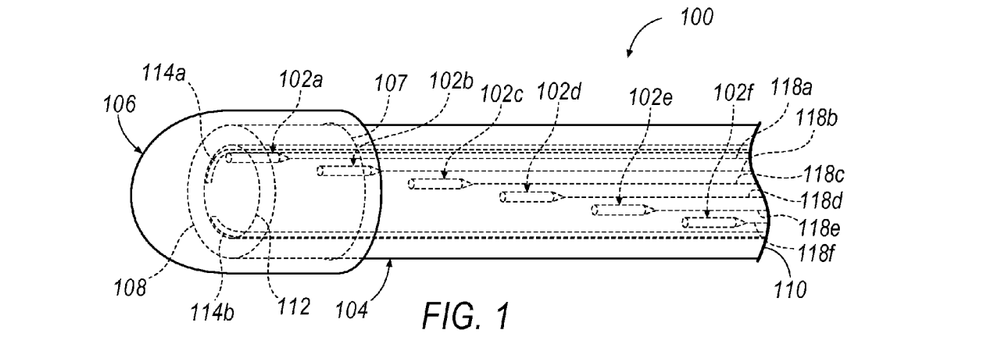
FIG. 1 illustrates an exemplary assembly of the present disclosure, e.g., a cable assembly having a plurality of cable connectors, a cable jacket, and a cap.

FIG. 1 illustrates an exemplary assembly 100 having one or a plurality of cable connectors 102, a cable jacket 104, and a cap 106. Assembly 100 may take many different forms and include multiple and/or alternate components and facilities. While an exemplary assembly 100 is shown in FIG. 1, the exemplary components illustrated in FIG. 1 are not intended to be limiting. Indeed, additional or alternative components and/or implementations may be used.

As illustrated in FIG. 1, assembly 100 may include one or a plurality of cable connectors 102. The plurality of cable connectors 102 may include any number of cable connectors 102, e.g., cable connectors 102 a-f. Each cable connectors 102 may include one or a plurality of optical fibers 118, e.g., optical fibers 118 a-f. Each optical fiber 118 may further include one or a plurality of fibers bundled in any increment, e.g., increments of 12 such as 24, 36, 48, 60, 72, 84, 96, 108, 120, 132, 144, etc. The plurality of cable connectors 102 may include a first configuration, e.g., external to the cable jacket 104 as described in more detail below with respect to FIGS. 5a and 5b, and a second configuration, e.g., internal to the cable jacket 104 as shown in FIG. 1. Thus, the first configuration may be configured for installation of the assembly 100 at an installation site and the second configuration may be configured to protect the assembly 100 during installation.

The cable jacket 104 may be configured to position the plurality of cable connectors 102 relative to each other and protect the plurality of cable connectors 102, e.g., from contaminants such as dust, dirt, and moisture as well as damage to the cable connectors 102. The cable jacket 104 may include a first portion 108 and a second portion 110. As better shown in FIG. 2, the cable jacket 104 may include a jacket passage 112 between the first portion 108 and the second portion 110. The jacket passage 112 may be configured to selectively receive the plurality of cable connectors 102, e.g., in the first configuration as shown in FIG. 1, and receive the plurality of cable connectors 102, e.g., in the second configuration as described below with respect to FIGS. 5a and 5b. Thus, the plurality of cable connectors 102 may be received from the first configuration, external to the jacket passage 112, to the second configuration, internal to the jacket passage 112, to provide protection from contaminants and damage during routing of the assembly 100 to the installation site.

Figure 2:
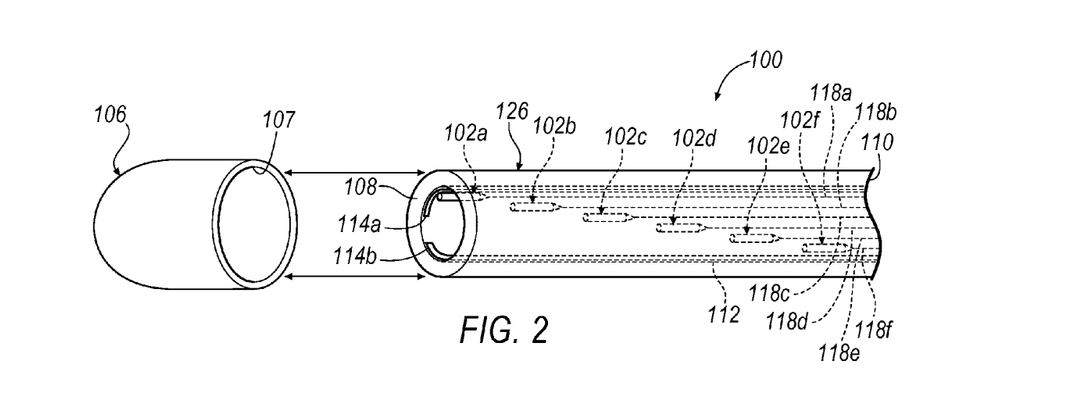
FIG. 2 illustrates an exemplary assembly, e.g., a cap being positioned relative to a cable jacket.

As shown in FIG. 2, the cap 106 may be configured to cover at least a portion of the cable jacket 104, e.g., at the first portion 108. The cap 106 may protect the cable connectors 102 and provide a rounded surface thereby facilitating the passage of assembly 100 into and through existing ducts leading to the installation site. The cap 106 may be configured to receive the cable jacket 104 and may be secured relative to the cable jacket 104 using at least one of an adhesive, a friction fit, or a compression fit. The cap 106 may include a recess 107 having a predefined depth based on the size of the cable jacket 104, e.g., approximately a forth of, a third of, half of, equal to, or twice the inner width (e.g., the width of passage 112) or the outer width of the cable jacket 104. The cap 106 may be configured to cover at least a portion of the jacket passage 112, e.g., while the plurality of cable connectors 102 is in the second configuration. The cap 106 may also include a brightly-colored or reflective material such as rubber, plastic, or metal, e.g., to facilitate visual identification or differentiation of a particular cable assembly 100. The cap 106 may also be configured to receive the plurality of cable connectors 102 from the first configuration to the second configuration, e.g., during assembly, and may be configured to expose and release the plurality of cable connectors 102 from the second configuration to the first configuration, e.g., during installation. Thus, the cap 106 may reduce contaminants in and facilitate the identification and installation of the assembly 100.

The assembly 100 may further include one or more rip cords 114a-b, e.g., to facilitate movement of the cable connectors 102 from the second configuration to the first configuration, e.g., during deployment at an installation site. Each rip cord 114 may be positioned in the cable jacket 104. Each rip cord 114 may be configured to urge one or more of the plurality of cable connectors 102 from the second configuration to the first configuration, e.g., from the interior to the exterior of the jacket passage 112.

Figure 3:
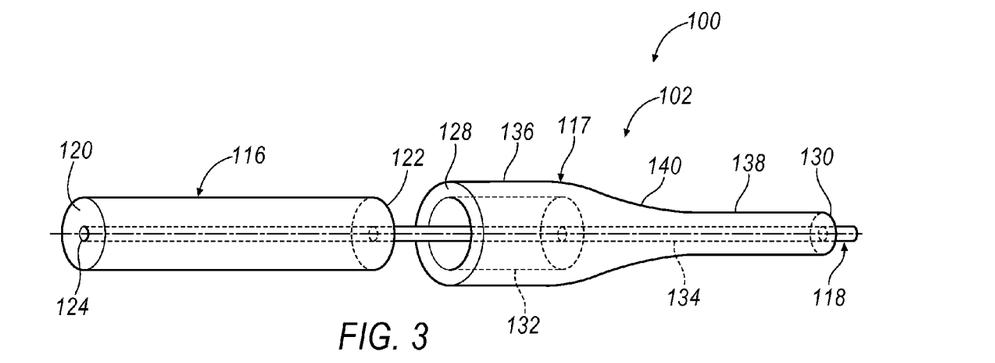
FIG. 3 illustrates an exemplary cable connector, e.g., having a ferrule, a cable boot, and a fiber.

Referring to FIG. 3, each cable connector 102 may include ferrule 116, a cable boot 117, and a fiber 118. All or any portion of the ferrule 116 may include a conductive material, e.g., a ceramic material, to facilitate optical connection, e.g., with the fiber distribution hub. The ferrule 116 may include a ferrule passage 124 between a leading end 120 and a trailing end 122. The ferrule passage 124 may be configured to receive the fiber 118. The ferrule passage 124 may be secured relative to optical fiber 118 using at least one of an adhesive, a friction fit, or a compression fit. All or any portion of the ferrule 116 may include a polished surface at the leading end 120 to facilitate optical connection with, e.g., the fiber distribution hub. The ferrule 116 may be a LC-type connector (also referred to as a "Lucent connector," "little connector," or "local connector") and configured to connect with and selectively lock into the fiber distribution hub. The ferrule 116 may be received in a connector housing, e.g., an LC connector housing, that is dimensioned and configured to fit into the fiber distribution hub. The fiber 118 may include an optical fiber, e.g., a single or bare fiber (e.g., 250 micron) or a fiber bundle (e.g., 900 micron or 1.2 millimeter). The fiber 118 may be configured as a pre-terminated fiber that is cut to length during assembly, e.g., prior to being routed and deployed at the installation site. A plurality of fibers 118 may be dimensioned to one, different, or staggered lengths. For instance, each of the plurality of fibers 118 may be cut during assembly, e.g., before deployment and installation.

Figure 4:
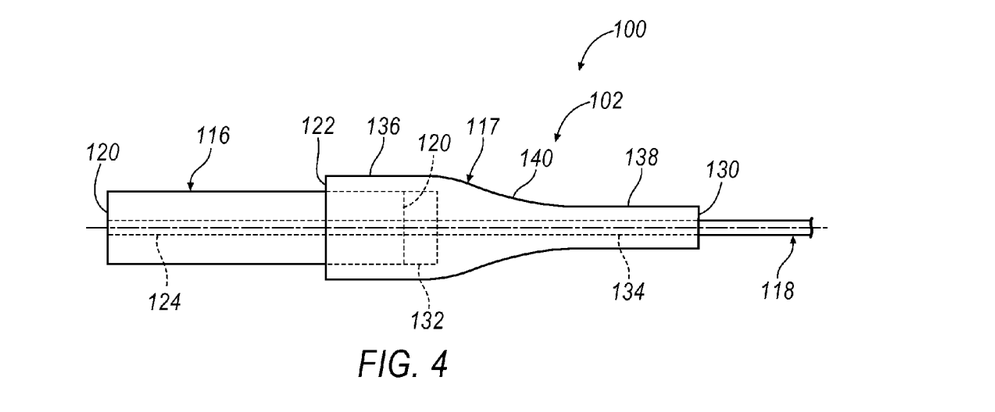
FIG. 4 illustrates an exemplary cable connector, e.g., with a ferrule, cable boot, and a fiber being positioned relative to each other.

As further shown in FIG. 4, the cable boot 117 may be configured to receive the ferrule 116 and position the fiber 118 with respect to the ferrule 116. The cable boot 117 may include a first end 128 and a second end 130. The first end 128 may include a recess 132 configured to receive at least a portion of the ferrule 116, which may be secured relative to the recess 132 using at least one of an adhesive, a friction fit, or a compression fit. The recess 132 may have a predefined depth based on the size of the ferrule 116, e.g., approximately a forth of, a third of, or half of the length of the ferrule 116. The cable boot 117 may include a boot passage 134 between the second end 130 and the recess 132. The boot passage 134 may be configured to receive at least a portion of the fiber 118. The cable boot 117 may include a first outer surface 136 and a second outer surface 138. The cable boot 117 may reduce in width from first outer surface 136 to second outer surface 138 along a taper 140, e.g., to reduce bending of and stress to the fiber 118. The ferrule 116 may be secured relative to the cable boot with at least one of an adhesive such as an epoxy, a friction fit, and a compression fit between the ferrule 116 and the cable boot 117. Each cable boot 117 may include a rubber or plastic material and may be a predestinated colored, e.g., to facilitate visual identification of one or more cable connectors 102 from the other cable connectors 102.

Figure 5A:
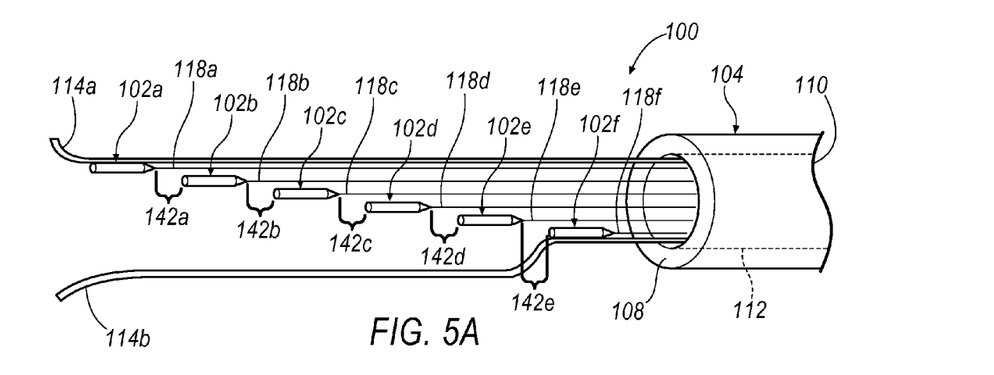
FIG. 5a illustrates an exemplary cable assembly, e.g., in a first configuration.
Figure 5B:
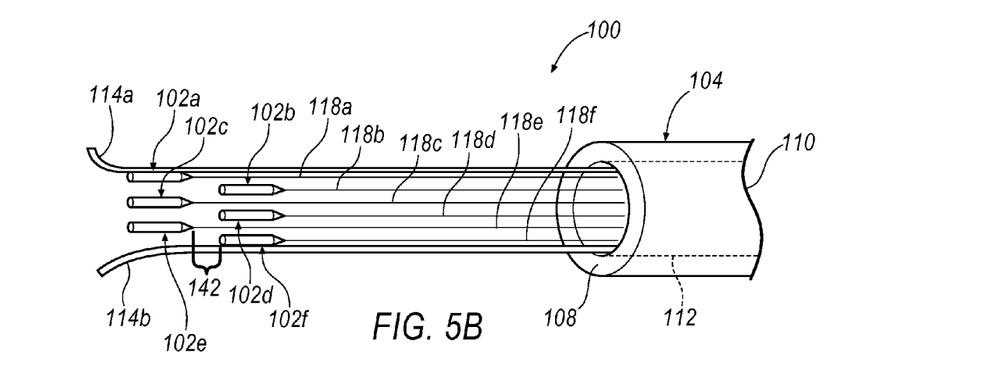
FIG. 5b illustrates an alternative cable assembly, e.g., in a first configuration.

Referring to FIGS. 5a and 5b, the assembly 100 may include a staggered configuration, e.g., in the first configuration as shown. As shown in FIG. 5a, any or all of the plurality of cable connectors 102 may be positioned at different distances 142 along each respective fiber 118 and relative to each other or relative to the first portion 108 of the cable jacket 104. For example, distances 142 may be predefined based on the size of the cable connector 102, e.g., approximately a forth of, a third of, half of, or equal to the length of the cable connector 102. With reference to FIG. 5b, each of cable connectors 102 may be separated by the same or different distances 142a-e as shown in FIG. 5b. The distances 142 may be selected based on the width and length of passage 112 that is to be consumed by the cable connectors 102. As a result, the width of passage 112 may be reduced by providing distances 142 as shown in FIG. 5a and the length of the passage 112 may be reduced by providing distances 142 as shown in FIG. 5b.

The plurality of cable connectors 102 may include a first subset of cable connectors 102, e.g., cable connectors 102a, 102c, and 102e, and a second subset of cable connectors 102, e.g., cable connectors 102b, 102d, and 102f. As shown in FIG. 5b, the first subset may be at a first axial position along each fiber 118 and the second subset may be at a second axial position along each respective fiber 118, which may be selected based on the width and length of the passage 112 of cable jacket 104 that is to be consumed by the cable connectors 102. For example, the first and second positions may be at different distances from the cable jacket 104, e.g., allowing for a reduced width of passage 112. Further, the plurality of connectors 102 may include any number of additional subsets of cable connectors, e.g., a third subset at a third axial position along each respective fiber 118. Thus, the relative positioning of the cable connectors 102 may be utilized to optimize the sizing of the passage 112.

Figure 6A:
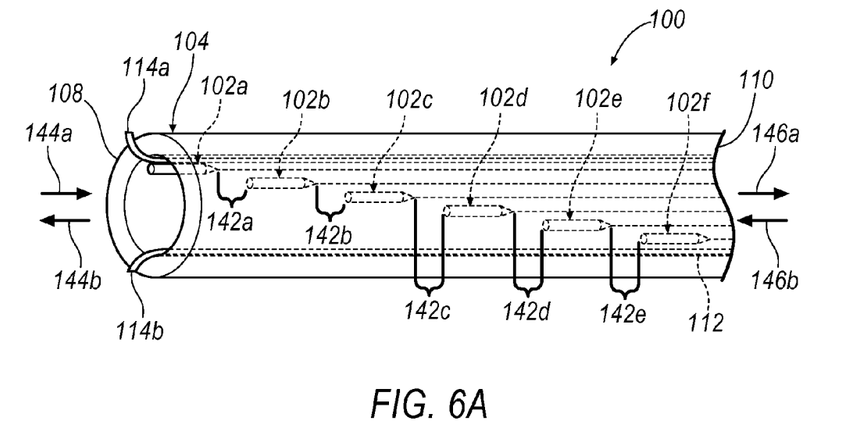
FIG. 6a illustrates the cable assembly of FIG. 5a, e.g., in a second configuration.
Figure 6B:
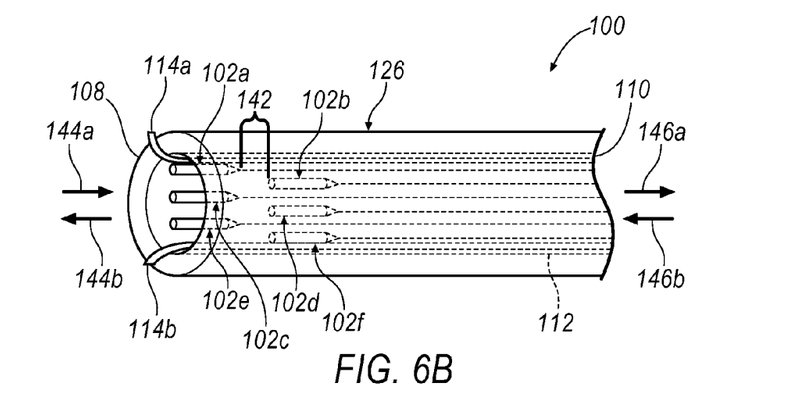
FIG. 6b illustrates the cable assembly of FIG. 5b, e.g., in a second configuration.

Referring to FIGS. 6a and 6b, the plurality of cable connectors 102 may be received in the cable jacket 104, e.g., in the second configuration as shown. As shown in FIG. 6a, the plurality of cable connectors 102 may be received in the cable jacket 104 while the cable connectors 102 are positioned at different distances 142 along the their respective fibers 118 and relative to each other, which may be advantageous in reducing the width of passage 112 needed to accommodate the plurality of cable connectors 102. Referring to FIG. 6b, the plurality of cable connectors 102 may also be received in the cable jacket 104 while the cable connectors 102 are positioned in the first and second subsets, which may be advantageous in reducing the length along the passage 112 that is needed to receive the plurality of cable connectors 102. Thus, the plurality of cable connectors 102 may be configured to minimize usage of the passage 112, thereby optimizing or reducing the length and width of the assembly 100.

The plurality of cable connectors 102 may be configured to move between the first and second configurations in response to a first force 144 at the first portion 108 and a second force 146 at the second portion 110. Either or both of the first and second forces 144, 146 may include an airflow force, a pulling force, a pushing force, or a combination thereof. The plurality of cable connectors 102 may be bundled by the cable jacket 104 thereby forming a unitary cable body. The cable connectors 102 may be air-jetted, e.g., by a blower, thereby providing the airflow force. Further, the pulling or pushing force may be applied relative to one or more rip cords 114 or directly to the cable connector 102, e.g., one or more fibers 118. The first force 144 may be provided in conjunction with the second force 146 to move the plurality of cable connectors between the first and second configurations. Further, the first and second forces 144a, 146a may be in a first direction and the first and second forces 144b, 146b may be in a second direction, e.g., relative to the cable jacket 104. For instance, the plurality of cable connectors 102 may be urged to the second configuration using a first force 144, e.g., an airflow force, at the first portion 108 of the cable jacket 104 and a second force 146, e.g., a pulling force, at the second portion 110.

Figure 7A:
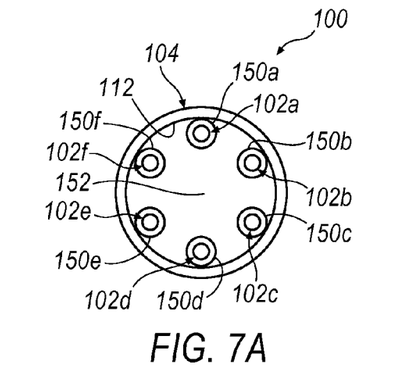
FIG. 7a illustrates an plurality of cable connectors, e.g., in a circular configuration.
Figure 7B:
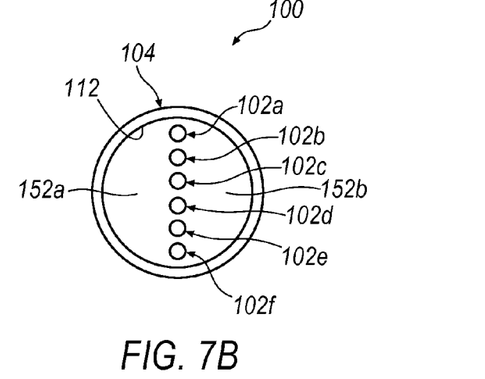
FIG. 7b illustrates a plurality of cable connectors, e.g., in a linear configuration.
Figure 7C:
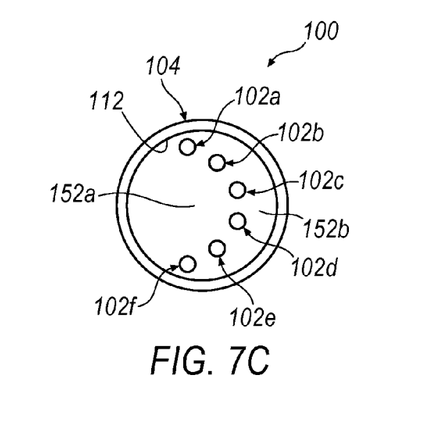
FIG. 7c illustrates a plurality of cable connectors, e.g., in an arcuate configuration.
Figure 7D:
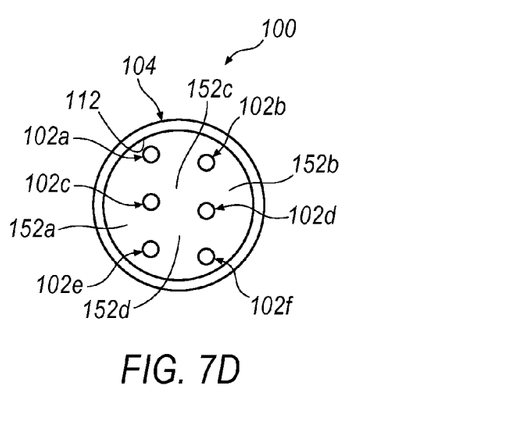
FIG. 7d illustrates a plurality of cable connectors, e.g., in a matrix configuration.

FIGS. 7a-d illustrate cross-section views of various exemplary illustrations of assembly 100. For example, the plurality of cable connectors 102 may be positioned along an inner wall of the jacket passage 112 in a circular configuration as shown in FIG. 7a, e.g., to form a passage 152 within to the central configuration thereby allowing an airflow to facilitate movement of each cable connector 102 into the jacket passage 112. The cable jacket 104 may also include a plurality of micro-ducts 150a-f, e.g., to receive one or more cable connector 102 and bundle optical fibers 118 in increments, as discussed above. The plurality of cable connectors 102 may be positioned in a linear configuration between opposing walls of the jacket passage 112 as shown in FIG. 7b, e.g., to allow airflow and form first and second passages 152a, 152b on opposing sides of the linear configuration. The plurality of connectors 102 may be positioned in an arcuate configuration as shown in FIG. 7c, e.g., to allow airflow and form first and second passages 152a, 152b on opposing sides of the arcuate configuration. The plurality of connectors 102 may be configured in a matrix configuration having any number of rows and columns as shown in FIG. 7d, e.g., to allow airflow and form first and second passages 152a, 152b on opposing sides of the matrix configuration and third and fourth passages 152c, 152d within the matrix configuration.

Each configuration may have a number of advantages. For example, the circular configuration may provide increased airflow relative to other configurations. The linear configuration may provide increased bending of the assembly 100 toward one of the first and second passages 152a, 152b. The arcuate configuration may provide increased collapse of the assembly, e.g., allowing movement of connectors 102a and 102f together for ease of movement relative to the jacket 104. The matrix configuration may provide increased distribution of airflow around each of connectors 102. Thus, the assembly 100 may be designed and configured to optimize assembly and installation.

Figure 8:
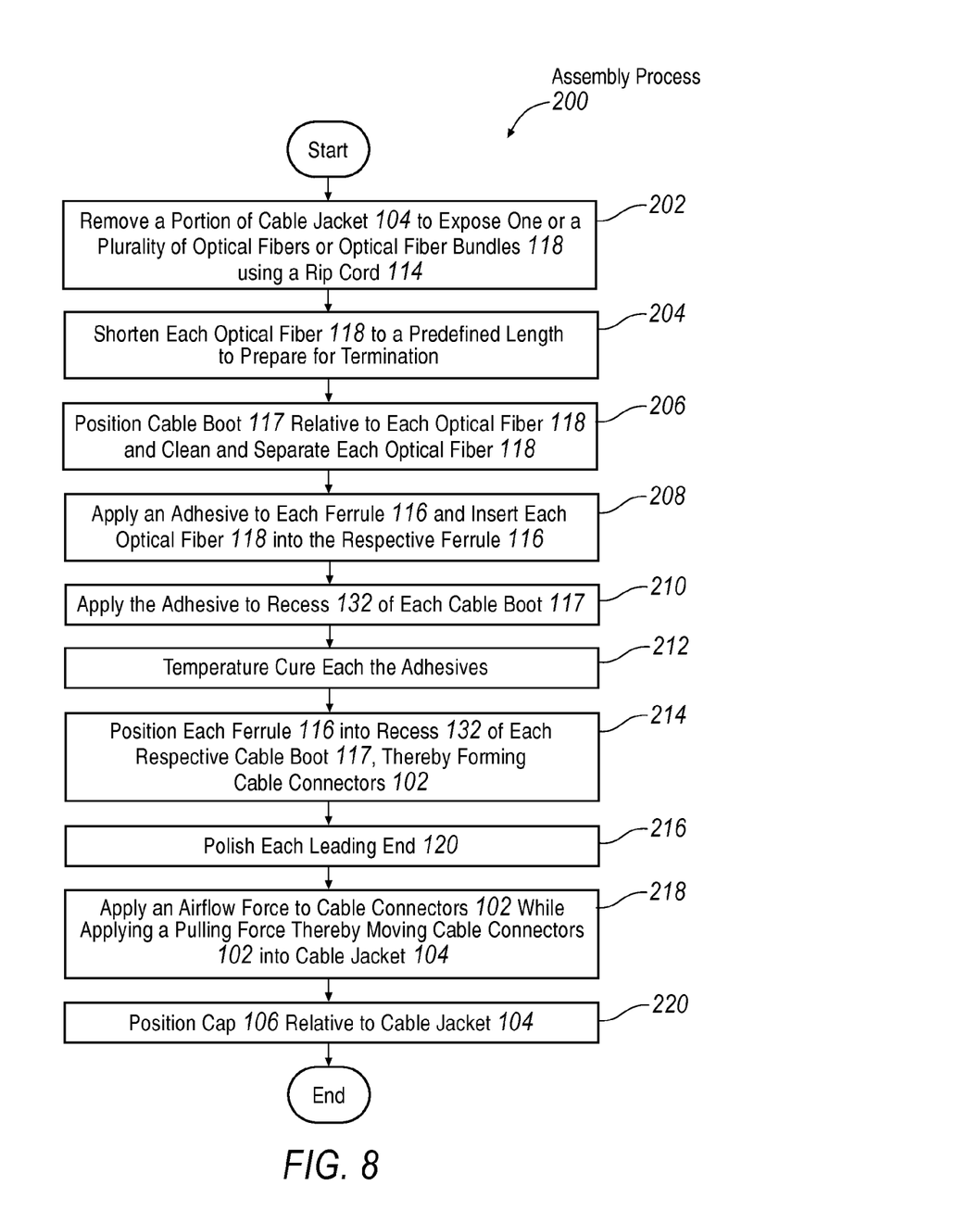
FIG. 8 illustrates an exemplary assembly process of a cable assembly.

FIG. 8 illustrates an exemplary assembly process 200 for a cable assembly 100. Process 200 may take many different forms and include multiple and/or alternate steps. While an exemplary process is shown in FIG. 8, the exemplary steps illustrated in FIG. 8 are not intended to be limiting. Indeed, additional or alternative steps and/or implementations may be used.

In block 202, a portion of a cable jacket 104 may be removed, e.g., stripped, to expose one or a plurality of optical fibers or optical fiber bundles 118.

In block 204, each optical fiber 118 may be shortened to one or a plurality of predefined lengths, e.g., to provide a pre-terminated optical fiber 118. The predefined lengths may include the same or different lengths, as described above with respect to FIGS. 5a and 6a. The predefined length may also include any number of subsets, as described with respect to FIGS. 5b and 6b.

In block 206, each cable boot 117 may be positioned relative to a respective optical fiber 118, as described above with respect to FIG. 3, and each optical fiber 118 may be cleaned and separated from the other optical fibers 118.

In block 208, an adhesive may be applied to each ferrule 116 and each optical fiber 118 may be inserted into a respective ferrule 116.

In block 210, the adhesive may be applied to a recess 132 of each cable boot 117.

In block 212, the adhesives may be temperature cured.

In block 214, each ferrule 116 may be positioned into the recess 132 of each respective cable boot 117 thereby forming the plurality of cable connectors 102, as described above with respect to FIGS. 4, 5a, and 5b.

In block 216, each cable connector 132 may be temperature cured the leading end 120 of each ferrule 116 may be polished.

In block 218, an airflow force, e.g., using an air-jet, may be applied to the plurality of cable connectors 102 (e.g., bundled by the cable jacket 104 thereby forming a unitary cable body) while a pulling force, e.g., a gentle pulling force on an opposite end of the cable jacket 104, thereby to move the plurality of cable connectors 102 between the first configuration and the second configuration thereby moving the plurality of cable connectors 102 into the cable jacket 104, as described above with respect to FIGS. 6a and 6b. Further, one or more rip cords 114 may be may positioned in the cable jacket 104 and a dust cover may be positioned onto each ferrule 116.

In block 220, a cap 106 may be positioned relative to the cable jacket 104 thereby covering the plurality of cable connectors 102, as described above with respect to FIGS. 1 and 2. After block 220, the assembly process 200 ends.

Figure 9:
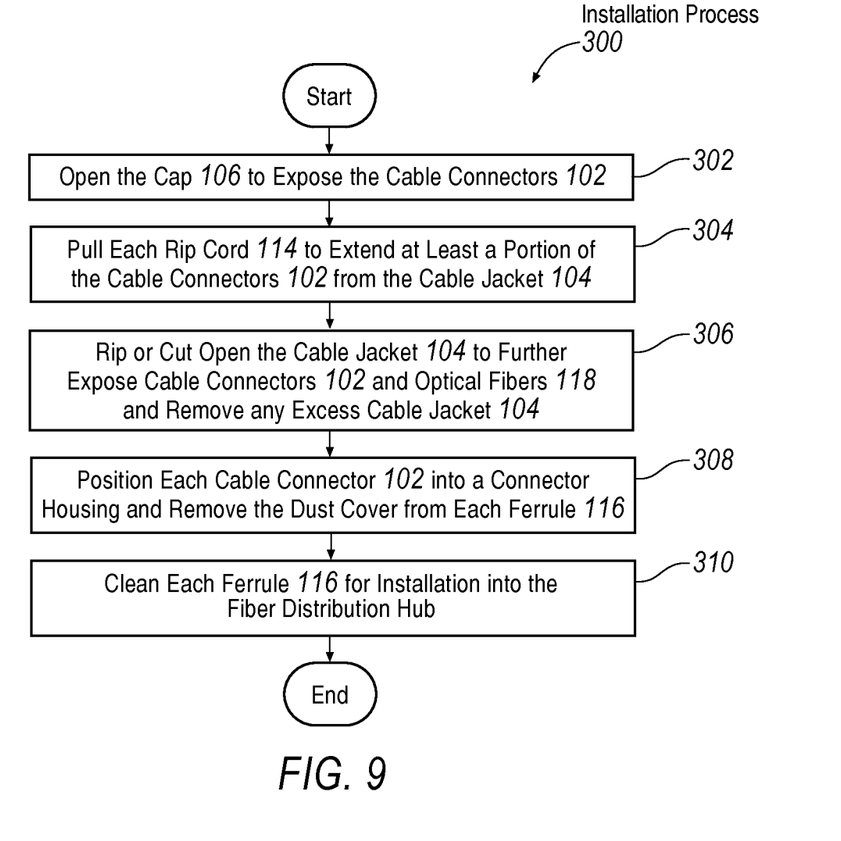
FIG. 9 illustrates an exemplary installation process of a cable assembly.

FIG. 9 illustrates an exemplary installation process 300 for a cable assembly 100. Process 300 may take many different forms and include multiple and/or alternate steps. While an exemplary process is shown in FIG. 9, the exemplary steps illustrated in FIG. 9 are not intended to be limiting. Indeed, additional or alternative steps and/or implementations may be used.

In block 302, the cap 106 may be opened to expose the cable connectors 102.

In block 304, the rip cord 114 may be pulled to extend at least a portion of the cable connectors 102 from the cable jacket 104.

In block 306, the cable jacket 104 may be ripped or cut open to further expose cable connectors 102 and optical fibers 118 and any excess cable jacket 104 may be removed.

In block 308, each cable connector 102 may be positioned into a connector housing (e.g., an LC connector housing) and the dust cover may be removed from each ferrule 116.

In block 310, each ferrule 116 may be cleaned for installation into the fiber distribution hub. After block 310, the installation process 300 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A cable assembly comprising:
    a plurality of cable connectors having a first configuration and a second configuration, each cable connector including:
        a ferrule having a ferrule passage between a leading end and a trailing end, the ferrule passage being configured to receive an optical fiber, and
        a cable boot having a first end and a second end, the first end having a recess configured to receive at least a portion of the ferrule, the cable boot having a boot passage between the second end and the recess, the boot passage being configured to receive at least a portion of the optical fiber; and
    a cable jacket having a jacket passage between a first portion and a second portion, the jacket passage being configured to selectively release the plurality of cable connectors in the first configuration and receive the plurality of cable connectors in the second configuration;
    wherein the plurality of cable connectors are external to the cable jacket in the first configuration and internal to the cable jacket in the second configuration, and
    wherein the plurality of cable connectors is urged to the second configuration using an airflow force at the first portion of the cable jacket and a pulling force at the second portion of the cable jacket.

2. The assembly of claim 1, further comprising a cap configured to cover at least a portion of the jacket passage while the plurality of cable connectors are in the second configuration.

3. The assembly of claim 1, wherein at least one of the first and second configurations include a staggered configuration.

4. The assembly of claim 1, wherein the plurality of cable connectors include a first subset of cable connectors and a second subset of cable connectors, wherein the first subset is at a first position along each respective optical fiber and the second subset is at a second position along each respective optical fiber, the first and second positions being at different distances from the cable jacket.

5. The assembly of claim 4, wherein the plurality of connectors further includes a third subset of cable connectors at a third position along each respective optical fiber.

6. The assembly of claim 1, wherein the ferrule is secured relative to the cable boot with at least one of an adhesive, a friction fit, and a compression fit.

7. The assembly of claim 1, wherein the ferrule includes a ceramic material and the leading end includes a polished surface.

8. The assembly of claim 1, further comprising a rip cord positioned in the cable jacket, wherein the rip cord is configured to urge the at least one of the plurality of cable connectors from the second configuration to the first configuration.

9. A cable assembly comprising:
    a plurality of cable connectors having a first configuration and a second configuration, the plurality of cable connectors including a first subset at a first axial position and a second subset at a second axial position, each cable connector including:
- a ferrule having a leading end and a trailing end, the ferrule having a ferrule passage between the leading end and trailing end, the ferrule passage being configured to receive an optical fiber, and
- a cable boot having a first end and a second end, the first end having a recess configured to receive at least a portion of the ferrule, the cable boot having a boot passage between the second end and the recess, the boot passage being configured to receive at least a portion of the optical fiber;
- a cable jacket having a jacket passage between a first portion and a second portion; and
- a rip cord configured to be positioned in at least a portion of the cable jacket,
- wherein the rip cord is configured to urge the at least one of the plurality of cable connectors from the second configuration to the first configuration.

10. The assembly of claim 9, the jacket passage being configured to selectively release the plurality of cable connectors in the first configuration and receive the plurality of cable connectors in the second configuration.

11. The assembly of claim 1, further comprising a cap configured to cover at least a portion of the jacket passage while the plurality of cable connectors are in the second configuration.

12. The assembly of claim 9, wherein the plurality of cable connectors move between the first and second configurations in response to at least one of an airflow force and a pulling force.

13. The assembly of claim 1, wherein at least one of the first and second configurations include a staggered configuration.

14. The assembly of claim 4, wherein the plurality of connectors further includes a third subset of cable connectors at a third axial position.

15. A method for a cable assembly, comprising:
- removing a portion of a cable jacket to expose a plurality of optical fibers;
- cutting each of the plurality of optical fibers to a predefined length;
- positioning a cable boot relative to each of the plurality of optical fibers;
- positioning a ferrule along each of the plurality of optical fibers and into a recess of each respective cable boot thereby forming a plurality of cable connectors;
- applying a force to the plurality of cable connectors to move the plurality of cable connectors between a first configuration and a second configuration thereby moving the plurality of cable connectors into the cable jacket; and
- positioning a cap relative to the cable jacket thereby covering the plurality of cable connectors.

16. The method of claim 15, further comprising:
- opening the cap to expose the plurality of cable connectors; and
- pulling a rip cord to extend at least a portion of the plurality of cable connectors from the cable jacket.

17. The method of claim 16, further comprising:
- cleaning the plurality of cable connectors; and
- connecting at least a portion of the plurality of cable connectors with a fiber distribution hub.

18. The method of claim 15, wherein applying the force includes applying an airflow force at a first portion of the cable jacket and applying a pulling force at a second portion of the cable jacket.

19. The assembly of claim 9, wherein the plurality of cable connectors is urged to the second configuration using an airflow force at a first portion of the cable jacket and a pulling force at a second portion of the cable jacket.

20. The method of claim 15, further comprising:
- urging at least one of the plurality of cable connectors from the second configuration to the first configuration with a rip cord.

* * * * *